United States Patent
Senoo

(10) Patent No.: US 9,825,579 B2
(45) Date of Patent: Nov. 21, 2017

(54) TEMPERATURE ESTIMATING APPARATUS FOR SYNCHRONOUS MOTOR

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 38 days.

(21) Appl. No.: 15/098,768

(22) Filed: Apr. 14, 2016

(65) Prior Publication Data

US 2016/0352275 A1 Dec. 1, 2016

(30) Foreign Application Priority Data

May 27, 2015 (JP) .................. 2015-107660

(51) Int. Cl.
*H02P 21/14* (2016.01)
*H02P 29/66* (2016.01)
*H02P 29/60* (2016.01)

(52) U.S. Cl.
CPC .......... *H02P 29/662* (2016.11); *H02P 29/664* (2016.11); *H02P 29/67* (2016.11)

(58) Field of Classification Search
CPC ....................................................... H02P 21/14
USPC .............................. 318/400.02, 400.01, 700
See application file for complete search history.

(56) References Cited

U.S. PATENT DOCUMENTS 8,829,830 B2 * 9/2014 Kobayashi .............. H02P 21/06
318/400.01
2014/0346991 A1 11/2014 Dib et al.

FOREIGN PATENT DOCUMENTS

| JP | 200892649 A | 4/2008 |
| JP | 201041839 A | 2/2010 |
| JP | 201141343 A | 2/2011 |
| JP | 201255119 A | 3/2012 |

(Continued)

OTHER PUBLICATIONS

English Abstract for Japanese Publication No. 2014-230486 A, published Dec. 8, 2014, 1 pg.

(Continued)

*Primary Examiner* — David S Luo

(74) *Attorney, Agent, or Firm* — Fredrikson & Byron, P.A.

(57) ABSTRACT

A temperature estimating apparatus for a synchronous motor comprises: a voltage command generating unit for controlling d-phase current by increasing or decreasing d-phase and q-phase voltages; a voltage acquiring unit for d-phase and q-phase voltages when the d-phase current is varied; a rotating speed detecting unit for the synchronous motor; a current detecting unit for the d-phase and q-phase currents; a winding temperature acquiring unit; a winding resistance converting unit for winding resistance from winding temperature; an inductance calculating unit for d-axis inductance based on the variation of the d-phase current and the q-phase voltage and on the rotating speed; a counter electromotive voltage constant calculating unit from the q-phase voltage, the varied d-phase current, the rotating speed, the q-phase current, the winding resistance, and the d-axis inductance; and a magnet temperature estimating unit for estimating magnet temperature based on the counter electromotive voltage constant.

2 Claims, 5 Drawing Sheets

(56) References Cited

FOREIGN PATENT DOCUMENTS

JP  2014222954 A  11/2014
JP  2014230486 A  12/2014

OTHER PUBLICATIONS

English Abstract and Machine Translation for Japanese Publication No. 2008092649 A, published Apr. 17, 2008, 16 pgs.
English Abstract for Japanese Publication No. 2014-222954 A, published Nov. 27, 2014, 1 pg.
English Abstract for Japanese Publication No. 2012-055119 A, published Mar. 15, 2012, 1 pg.
English Abstract for Japanese Publication No. 2011-041343 A, published Feb. 24, 2011, 1 pg.
English Abstract for Japanese Publication No. 2010-041839 A, published Feb. 18, 2010, 1 pg.

* cited by examiner

TEMPERATURE ESTIMATING APPARATUS FOR SYNCHRONOUS MOTOR

BACKGROUND OF THE INVENTION

1. Field of the Invention

The present invention relates to a temperature estimating apparatus for a synchronous motor, and more particularly to a temperature estimating apparatus for a synchronous motor for monitoring voltage between the terminals, etc., by varying d-phase current and estimates winding temperature by estimating counter electromotive voltage and winding resistance.

2. Description of the Related Art

In order to control a synchronous motor, it is important to know the temperature of the synchronous motor. A method for estimating the temperature of a synchronous motor is known which estimates magnet temperature based on the rate of decrease of counter electromotive voltage during the driving of the synchronous motor. The counter electromotive voltage can be calculated by subtracting from the voltage between the terminals a voltage induced by a current. As an alternative method, a method for estimating winding temperature based on the rate of increase of winding resistance is known.

A method for diagnosing a synchronous electric machine is known which measures the speed of the rotor of the synchronous electric machine and the voltages and currents of three phases by using an internal temperature measuring means, determines internal temperatures (coil and magnet temperatures) in the synchronous electric machine by using state observers for the resistance of the coils and the magnetic flux of the magnet, and diagnoses and controls the synchronous electric machine based on the internal temperatures thus determined (for example, refer to Japanese Unexamined Patent Publication No. 2014-230486).

A control apparatus that can reduce the model error of armature interlinkage magnetic flux (for example, refer to Japanese Unexamined Patent Publication No. 2008-92649) is known. A model of q-axis inductance $L_q$ is obtained by using an n-point approximation function, and calculations are performed to determine whether calculational conditions are satisfied or not. Next, an armature flux linkage model is calculated only when a calculation enable signal is output. Next, an armature resistance model is calculated by adding a main circuit cable resistance of a preset model to an armature winding resistance model obtained from an armature winding temperature model. Then, a motor constant estimating unit applies corrective calculation to a motor constant for calculating a rotor magnet pole position model signal and a rotor speed model signal.

SUMMARY OF THE INVENTION

However, since the variation of the q-axis inductance $L_q$ due to current is large, there is the problem that the calculation of the voltage resulting from a change in current is not accurate. Furthermore, since the magnet is attached to the rotor and rotates with it, there is the problem that it is difficult to directly measure the temperature using a device.

A temperature estimating apparatus for a synchronous motor according to one embodiment of the present invention comprises: a voltage command generating unit for controlling d-phase current by increasing or decreasing d-phase voltage and q-phase voltage by a command; a voltage acquiring unit for acquiring the d-phase voltage and q-phase voltage when the d-phase current is varied; a rotating speed detecting unit for detecting rotating speed of the synchronous motor; a current detecting unit for detecting the d-phase current and q-phase current; a winding temperature acquiring unit for acquiring winding temperature of the synchronous motor; a winding resistance converting unit for calculating winding resistance from the acquired winding temperature; an inductance calculating unit for calculating d-axis inductance based on the variation of the d-phase current and the variation of the q-phase voltage when the d-phase current is varied and on the rotating speed; a counter electromotive voltage constant calculating unit for calculating a counter electromotive voltage constant from the q-phase voltage, the d-phase current after being varied, the rotating speed, the q-phase current, the winding resistance, and the d-axis inductance; and a magnet temperature estimating unit for estimating magnet temperature of the synchronous motor based on the counter electromotive voltage constant.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

A synchronous motor temperature estimating apparatus according to the present invention will be described below with reference to the drawings. It will, however, be noted that the technical scope of the present invention is not limited by any particular embodiment described herein, but extends to the inventions described in the appended claims and their equivalents.

First Embodiment

Figure 1:
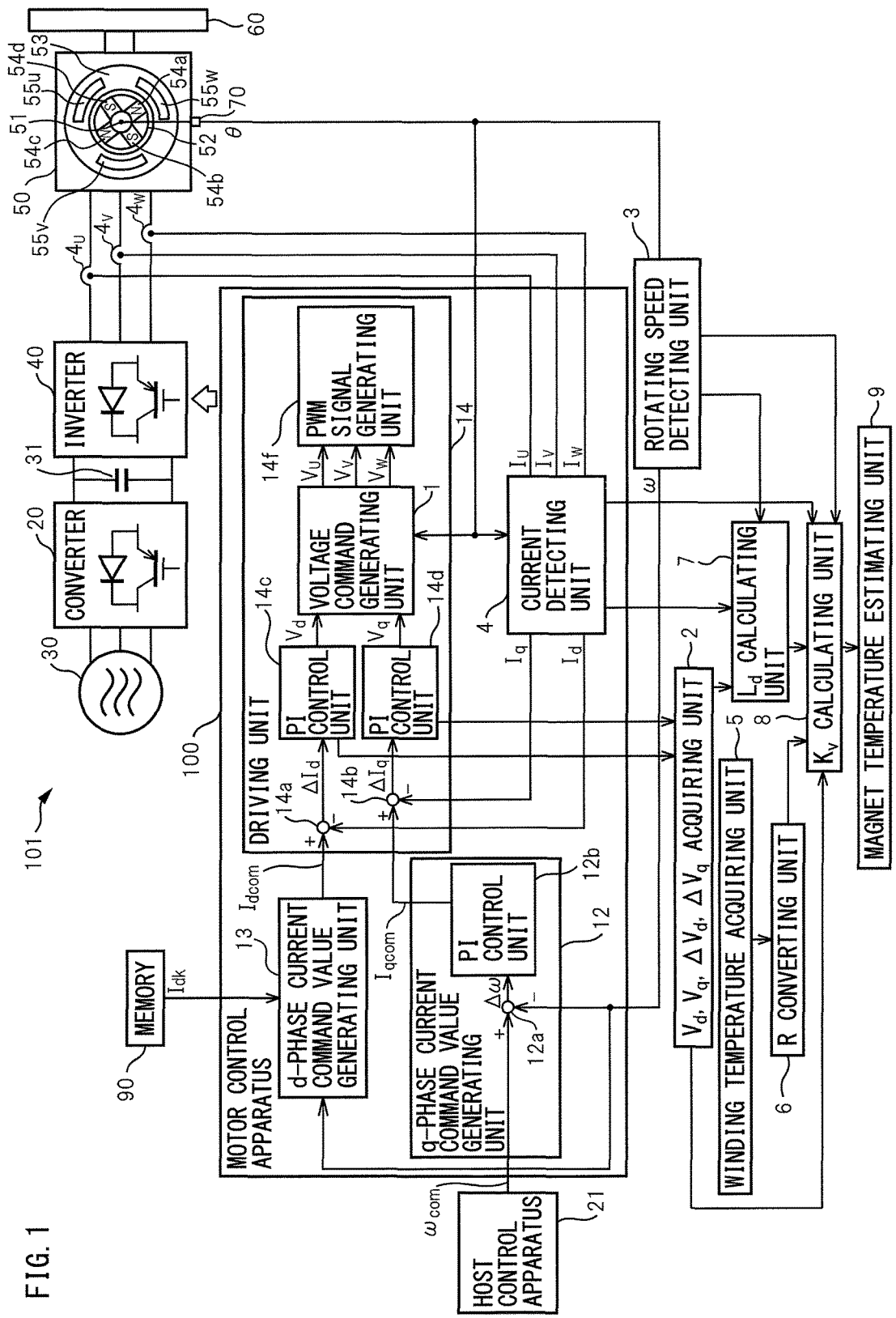
FIG. 1 is a diagram showing the configuration of a synchronous motor temperature estimating apparatus according to a first embodiment of the present invention.

First, a description will be given of a synchronous motor temperature estimating apparatus according to a first embodiment of the present invention. FIG. 1 shows the configuration of the synchronous motor temperature estimating apparatus according to the first embodiment of the present invention. The synchronous motor temperature estimating apparatus 101 according to the first embodiment of the present invention comprises a voltage command generating unit 1, a voltage acquiring unit 2, a rotating speed detecting unit 3, a current detecting unit 4, a winding temperature acquiring unit 5, a winding resistance converting unit 6, an inductance calculating unit 7, a counter electromotive voltage constant calculating unit 8, and a magnet temperature estimating unit 9. The voltage command generating unit 1 controls d-phase current by increasing or decreasing d-phase voltage and q-phase voltage by a command. The voltage acquiring unit 2 acquires the d-phase voltage and q-phase voltage when the d-phase current is varied. The rotating speed detecting unit 3 detects the rotating speed of the synchronous motor. The current detecting unit 4 detects the d-phase current and q-phase current. The winding temperature acquiring unit 5 acquires the winding temperature of the synchronous motor. The winding resistance converting unit 6 calculates winding resistance from the acquired winding temperature. The inductance calculating unit 7 calculates d-axis inductance based on the variation of the d-phase current and the variation of the q-phase voltage when the d-phase current is varied and on the rotating speed. The counter electromotive voltage constant calculating unit 8 calculates a counter electromotive voltage constant from the q-phase voltage, the d-phase current after being varied, the rotating speed, the q-phase current, the winding resistance, and the d-axis inductance. The magnet temperature estimating unit 9 estimates the magnet temperature of the synchronous motor based on the counter electromotive voltage constant.

The synchronous motor temperature estimating apparatus according to the first embodiment of the present invention shown in FIG. 1 will be described in detail below. A three-phase AC voltage from a three-phase AC power supply 30 is input to a converter 20 which converts the input AC voltage into a DC voltage for output. The DC voltage thus output is smoothed by a smoothing capacitor 31. The voltage is then input to an inverter 40 which performs PWM control and converts the input voltage into an AC voltage of a desired frequency for driving the synchronous motor 50. The synchronous motor 50 drives a driven member 60. U-phase current $I_u$, V-phase current $I_v$, and W-phase current $I_w$ supplied to the synchronous motor 50 are detected by U-phase, V-phase, and W-phase current detectors $4_u$, $4_v$, and $4_w$, respectively. The detected results are sent to the current detecting unit 4. The current detecting unit 4 calculates the d-phase current $I_d$ and q-phase current $I_q$ from the U-phase current $I_u$, V-phase current $I_v$, and W-phase current $I_w$.

The synchronous motor 50 includes a stator 53 having windings $55_u$, $55_v$, and $55_w$. The synchronous motor 50 further includes magnet pole pieces 54a and 54d inside the stator 53, and includes a rotor 52 which rotates about a center axis 51. A rotation angle detector 70 for detecting the rotation angle θ of the synchronous motor 50 is provided near the synchronous motor 50. The detected rotation angle θ is sent to the rotating speed detecting unit 3 which calculates the rotating speed ω by differentiating the rotation angle θ. Alternatively, the rotating speed ω may be calculated from the frequency of the drive current.

A synchronous motor control apparatus 100 comprises a q-phase current command value generating unit 12, a d-phase current command value generating unit 13, a driving unit 14, and the current detecting unit 4. The q-phase current command value generating unit 12 receives a speed command $\omega_{com}$ from a host control device 21 and, using a subtractor 12a, calculates a difference Δω by subtracting the rotating speed ω input from the rotating speed detecting unit 3 from the speed command $\omega_{com}$. The difference Δω is input to a PI control unit 12b which then outputs a q-phase current command $I_{qcom}$.

The d-phase current command value generating unit 13 outputs a d-phase current command $I_{dcom}$, based on a d-phase current value $I_{dk}$ stored in a memory 90 and the rotating speed ω input from the rotating speed detecting unit 3.

The d-phase current command $I_{dcom}$ is input to a subtractor 14a in the driving unit 14. The subtractor 14a outputs a difference $\Delta I_d$ by subtracting the d-phase current $I_d$ input from the current detecting unit 4 from the d-phase current command $I_{dcom}$. The thus output $\Delta I_d$ is converted by a PI control unit 14c into a d-phase voltage $V_d$. The d-phase voltage $V_d$ is input to the voltage command generating unit 1.

The q-phase current command $I_{qcom}$ is input to a subtractor 14b in the driving unit 14. The subtractor 14b outputs a difference $\Delta I_q$ by subtracting the q-phase current $I_q$ input from the current detecting unit 4 from the q-phase current command $I_{qcom}$. The thus output $\Delta I_q$ is converted by a PI control unit 14d into a q-phase voltage $V_q$. The q-phase voltage $V_q$ is input to the voltage command generating unit 1.

The voltage command generating unit 1 converts the d-phase voltage $V_d$ and q-phase voltage $V_q$ into U-phase voltage $V_u$, V-phase voltage $V_v$, and W-phase voltage $V_w$ which are output to a PWM signal generating unit 14f. In vector control, the d-phase current $I_d$ and q-phase current $I_q$ are controlled by increasing or decreasing the d-phase voltage $V_d$ and q-phase voltage $V_q$ by a command.

The voltage acquiring unit ($V_d$, $V_q$, $\Delta V_d$, $\Delta V_q$ acquiring unit) 2 acquires the d-phase voltage $V_d$ and q-phase voltage $V_q$ from the respective PI control units 14c and 14d when the d-phase current is varied. Instead of the d-phase voltage $V_d$ and q-phase voltage $V_q$, the command values of the respective voltages may be used. If the voltage between the terminals can be directly observed using an external measuring device, it may be possible to decompose it into sine and cosine components and use them as $V_d$ and $V_q$. In vector control, the phase of the q-axis current is known, as a matter of course. Therefore, sine and cosine components can be calculated by calculating the difference between the phase of the voltage between the terminals and the phase of the q-axis.

The winding temperature acquiring unit 5 acquires the temperature $T_c$ of the windings $55_u$, $55_v$, and $55_w$ of the synchronous motor 50. The winding temperature $T_c$ can be acquired by attaching a temperature detecting device (not shown) to the windings $55_u$, $55_v$, and $55_w$.

The winding resistance converting unit (R converting unit) 6 acquires the winding temperature $T_c$ from the winding temperature acquiring unit 5 and calculates the winding resistance R.

The inductance calculating unit ($L_d$ calculating unit) 7 calculates the d-axis inductance $L_d$ based on the variation of the d-phase current ($I_{d2}-I_{d1}$) and the variation of the q-phase voltage $\Delta V_q$ when the d-phase current is varied from $I_{d1}$ to $I_{d2}$ and on the rotating speed ω.

The counter electromotive voltage constant calculating unit ($K_v$ calculating unit) 8 calculates the counter electromotive voltage constant $K_v$ from the q-phase voltage $V_q$, the d-phase current $I_{d2}$ after being varied, the rotating speed ω, the q-phase current $I_q$, the winding resistance R, and the d-axis inductance $L_d$.

The magnet temperature estimating unit 9 estimates the magnet temperature $T_m$ of the synchronous motor 50 based on the counter electromotive voltage constant $K_v$.

Figure 2:
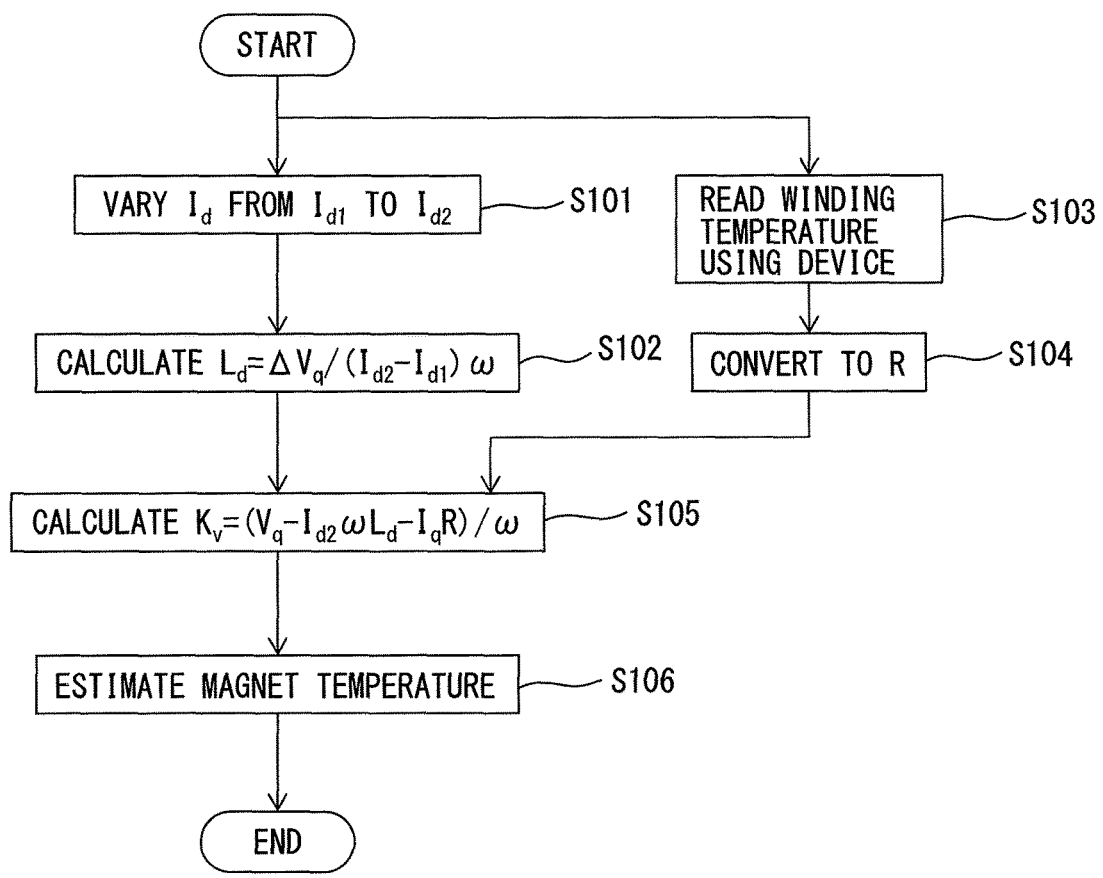
FIG. 2 is a flowchart for explaining the sequence of operations performed by the synchronous motor temperature estimating apparatus according to the first embodiment of the present invention.
Figure 3A:
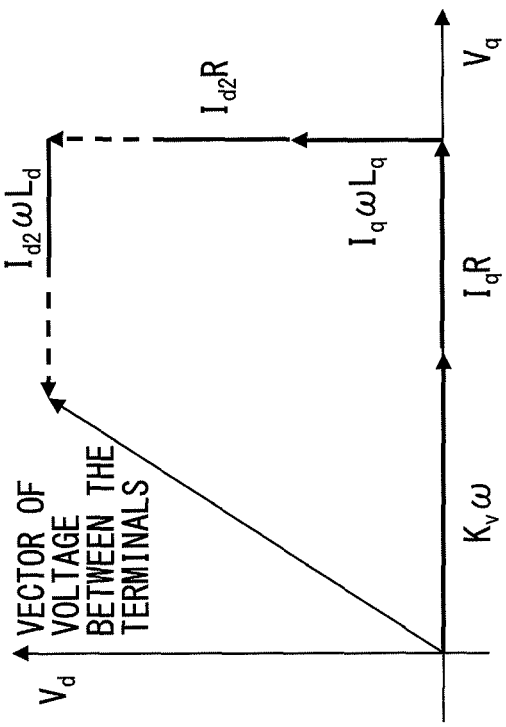
FIG. 3A is a graph illustrating the relationship of d-phase current, q-phase current, rotating speed, winding resistance, d-axis inductance, and counter electromotive voltage constant with respect to a vector of voltage between the terminals before d-phase current is varied in the synchronous motor temperature estimating apparatus according to the first embodiment of the present invention.
Figure 3B:
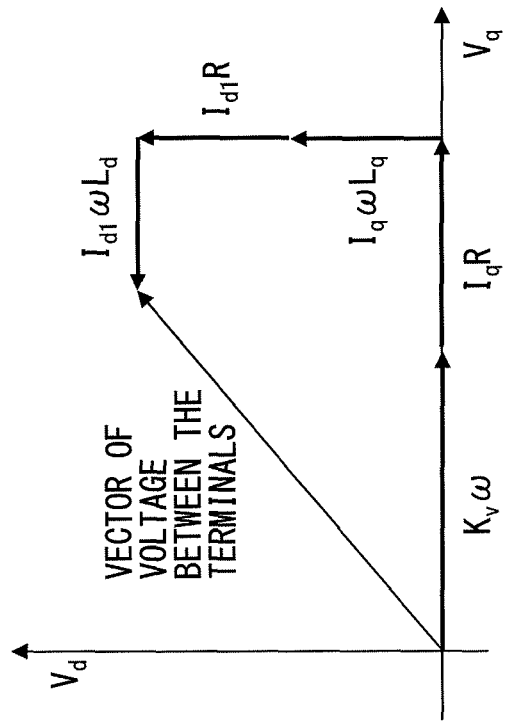
FIG. 3B is a graph illustrating the relationship of d-phase current, q-phase current, rotating speed, winding resistance, d-axis inductance, and counter electromotive voltage constant with respect to a vector of voltage between the terminals after d-phase current is varied in the synchronous motor temperature estimating apparatus according to the first embodiment of the present invention.

Next, the sequence of operations performed by the synchronous motor temperature estimating apparatus according to the first embodiment of the present invention will be described with reference to the flowchart of FIG. 2. First, in step S101, the d-phase current $I_d$ is varied from $I_{d1}$ to $I_{d2}$. FIGS. 3A and 3B illustrate the relationship of the d-phase current, q-phase current, rotating speed, winding resistance, d-axis inductance, and counter electromotive voltage constant with respect to the vector of voltage between the terminals before and after the d-phase current is varied. In FIGS. 3A and 3B, $I_{d1}$ and $I_{d2}$ are the d-phase current (reactive current), $I_q$ is the q-phase current (torque generating current), R is the winding resistance, $L_q$ is the q-axis inductance, $L_d$ is the d-axis inductance, ω is the rotating speed, and $K_v$ is the counter electromotive voltage constant.

In the synchronous motor temperature estimating apparatus according to the first embodiment of the present invention, vector control is performed to control the synchronous motor by assuming the following two preconditions.

(Precondition 1) Since the variation from $I_{d1}$ to $I_{d2}$ is done in a short time, the winding temperature and the magnet temperature remain unchanged before and after the variation.

(Precondition 2) The variation of the d-axis inductance $L_d$ caused by the variation from $I_{d1}$ to $I_{d2}$ is small.

Further, it is necessary that $K_v\omega$, $I_qR$, and $I_q\omega L_q$ be the same before and after the variation of $I_d$. That is, it is necessary that not only the rotating speed ω but also the torque remain unchanged. This corresponds to the situation where the motor is rotating at a constant speed with no external force acting on it. In this case, it is considered that a nearly constant torque that matches the dynamic friction of the axis is being output.

Next, in step S102, the d-axis inductance $L_d$ is calculated. From FIGS. 3A and 3B, it is seen that the difference between $I_{d2}\omega L_d$ and $I_{d1}\omega L_d$ represents the difference $\Delta V_q$. Hence, the following equation (1) is obtained.

$$\Delta V_q = I_{d2}\omega L_d - I_{d1}\omega L_d \quad (1)$$

Accordingly, by transforming the equation (1), the d-axis inductance $L_d$ can be calculated from the following equation (2).

$$L_d = \Delta V_q / (I_{d2} - I_{d1})\omega \quad (2)$$

In step S103, the winding temperature is read using a temperature detecting device. Next, in step S104, the winding resistance R is converted in accordance with the following equation (3):

$$R = R_1 \times (T_1 + 234.5 \text{(intrinsic value of copper)}/(\text{winding temperature} + 234.5) \quad (3)$$

where, $R_1$ is a winding resistance at winding temperature $T_1$.

Next, in step S105, the counter electromotive voltage constant $K_v$ is calculated. From FIG. 3B, $V_q$ as the q-axis component of the vector of voltage between the terminals is given by $K_v\omega + I_qR + I_{d2}\omega L_d$. Here, for $I_{d2}$, the direction of the arrow in the FIG. is taken as positive. Therefore, $K_v$ can be calculated from the following equation (4).

$$K_v = (V_q - I_{d2}\omega L_d - I_qR)/\omega \quad (4)$$

Next, in step S106, the magnet temperature is estimated using the counter electromotive voltage constant $K_v$. That is, magnetic flux density is calculated from the counter electromotive voltage constant $K_v$, and the magnet temperature is estimated from the magnet's temperature characteristics in accordance with the following equation (5).

$$\alpha(T - T_1) = 1 - (K_v/K_{v1}) \quad (5)$$

where α is the constant determined by the type of the magnet, T is the estimated temperature, and $K_{v1}$ is the counter electromotive voltage constant at temperature $T_1$ (for example, 20° C.)

As has been described above, according to the synchronous motor temperature estimating apparatus in the first embodiment of the present invention, the voltage between the terminals, etc. are monitored by varying the d-phase current, and the counter electromotive voltage and the winding resistance are estimated without using the q-axis inductance $L_q$; accordingly, the temperature of the synchronous motor can be estimated with good accuracy. Thus, the invention can, for example, achieve proper motor overheat protection and improve the accuracy of output estimation.

Second Embodiment

Figure 4:
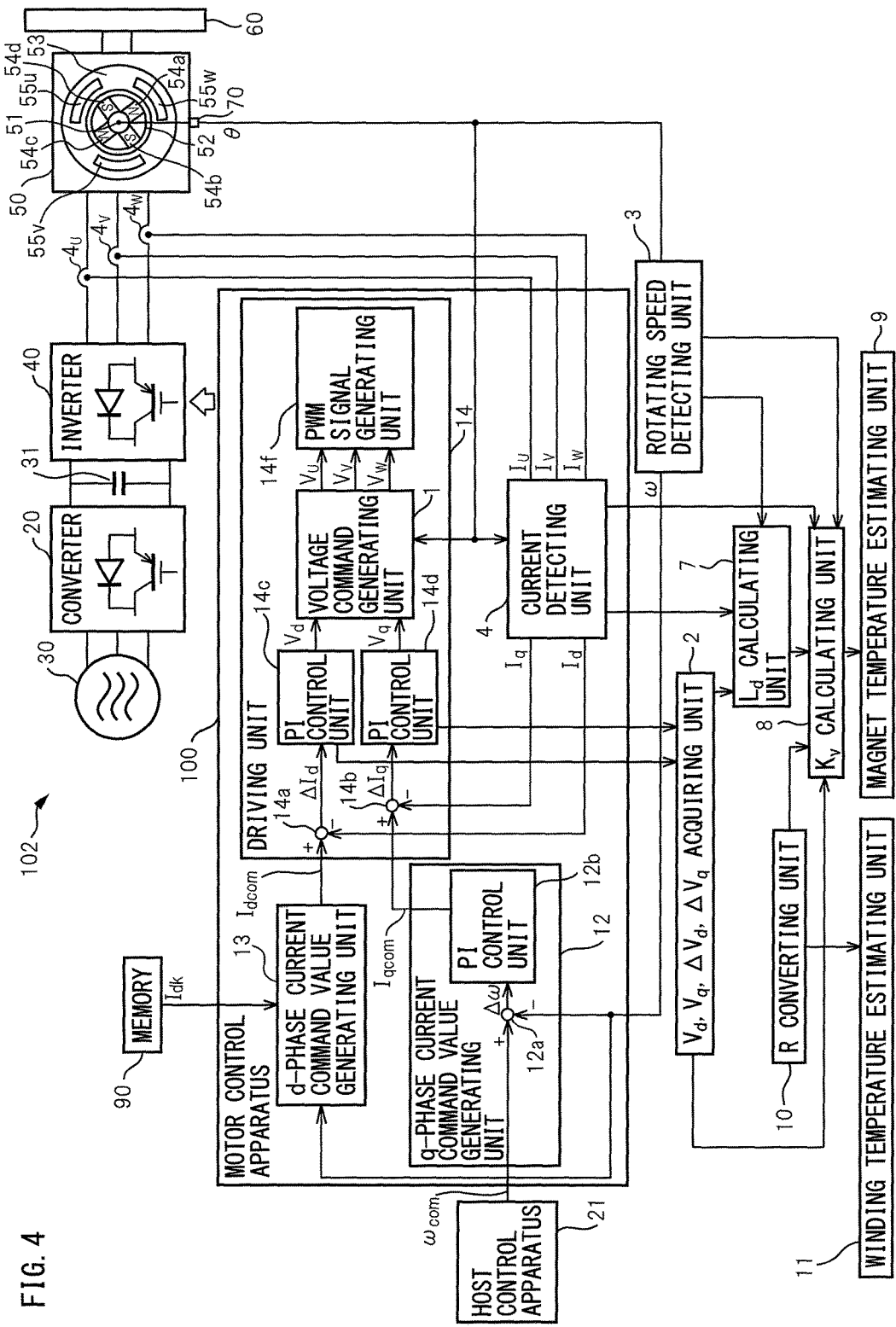
FIG. 4 is a diagram showing the configuration of a synchronous motor temperature estimating apparatus according to a second embodiment of the present invention.

Next, a synchronous motor temperature estimating apparatus according to a second embodiment of the present invention will be described. FIG. 4 shows the configuration of the synchronous motor temperature estimating apparatus according to the second embodiment of the present invention. The synchronous motor temperature estimating apparatus 102 according to the second embodiment of the present invention comprises a voltage command generating unit 1, a voltage acquiring unit 2, a rotating speed detecting unit 3, a current detecting unit 4, a winding resistance calculating unit 10, a winding temperature estimating unit 11, an inductance calculating unit 7, a counter electromotive voltage constant calculating unit 8, and a magnet temperature estimating unit 9. The voltage command generating unit 1 controls d-phase current by increasing or decreasing d-phase voltage and q-phase voltage by a command. The voltage acquiring unit 2 acquires the d-phase voltage and q-phase voltage when the d-phase current is varied. The rotating speed detecting unit 3 detects the rotating speed of the synchronous motor. The current detecting unit 4 detects the d-phase current and q-phase current. The winding resistance calculating unit 10 calculates winding resistance from the variation of the d-phase current and the variation of the d-phase voltage when the d-phase current is varied. The winding temperature estimating unit 11 estimates the winding temperature of the synchronous motor from the winding resistance. The inductance calculating unit 7 calculates d-axis inductance based on the variation of the d-phase current and the variation of the q-phase voltage when the d-phase current is varied and on the rotating speed. The counter electromotive voltage constant calculating unit 8 calculates a counter electromotive voltage constant from the q-phase voltage, the d-phase current after being varied, the rotating speed, the q-phase current, the winding resistance, and the d-axis inductance. The magnet temperature estimating unit 9 estimates the magnet temperature of the synchronous motor based on the counter electromotive voltage constant.

The synchronous motor temperature estimating apparatus 102 according to the second embodiment of the present invention differs from the synchronous motor temperature estimating apparatus 101 according to the first embodiment in the following respect. That is, in the synchronous motor temperature estimating apparatus 101 according to the first embodiment, the winding temperature acquiring unit 5 acquires the winding temperature of the synchronous motor, and the winding resistance converting unit 6 calculates the wiring resistance from the acquired winding temperature. By contrast, in the synchronous motor temperature estimating apparatus 102 according to the second embodiment, the winding resistance calculating unit 10 calculates the winding resistance from the variation of the d-phase current and the variation of the d-phase voltage when the d-phase current is varied, and the winding temperature estimating unit 11 estimates the winding temperature of the synchronous motor from the winding resistance. Otherwise, the configuration of the synchronous motor temperature estimating apparatus 102 according to the second embodiment is the same as that of the synchronous motor temperature estimating apparatus 101 according to the first embodiment, and therefore, the details of the configuration will not be further described herein.

Figure 5:
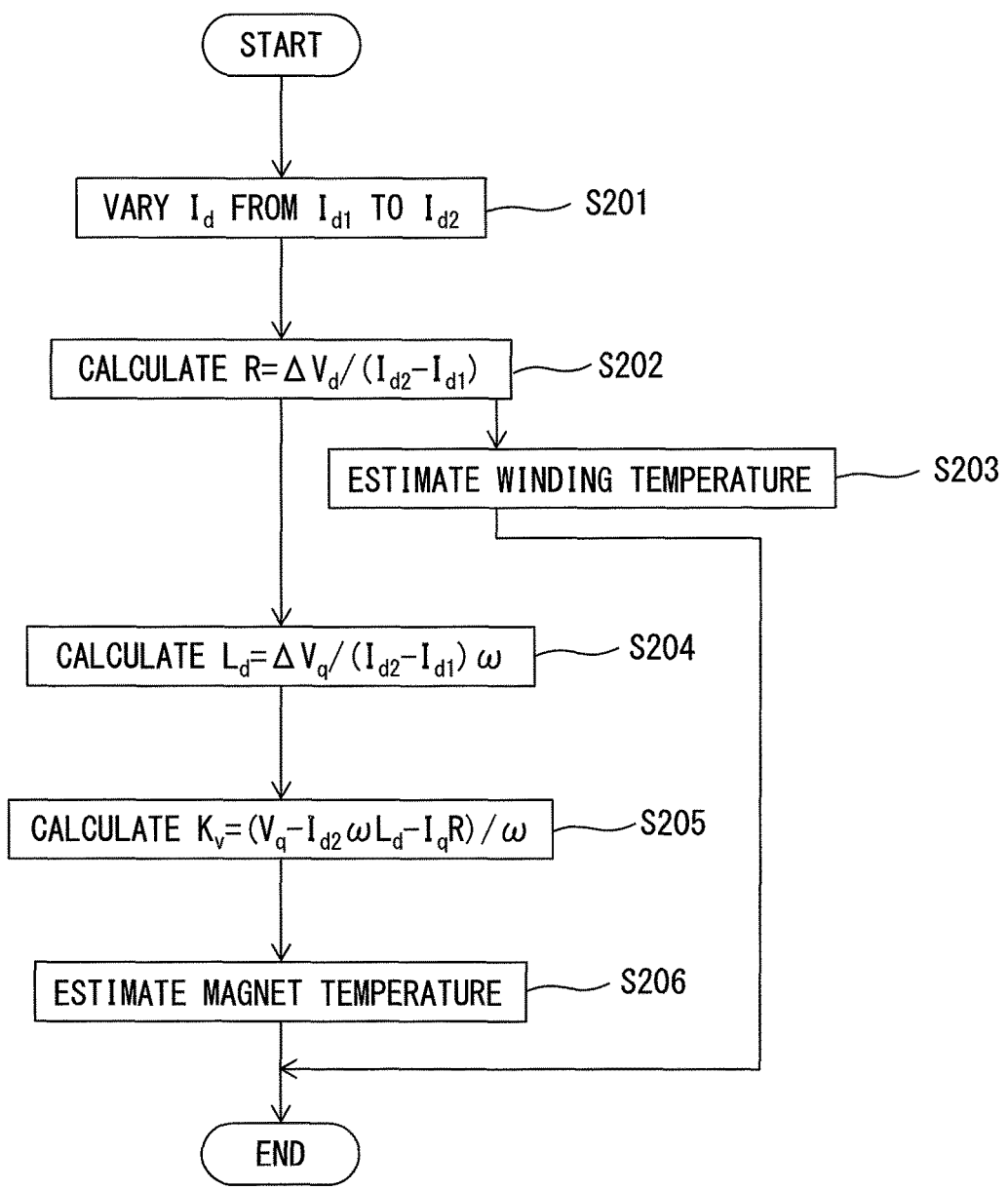
FIG. 5 is a flowchart for explaining the sequence of operations performed by the synchronous motor temperature estimating apparatus according to the second embodiment of the present invention.

Next, the sequence of operations performed by the synchronous motor temperature estimating apparatus according to the second embodiment of the present invention will be described with reference to the flowchart of FIG. 5. First, in step S201, the d-phase current $I_d$ is varied from $I_{d1}$ to $I_{d2}$. At this time, the relationship of the d-phase current, q-phase current, rotating speed, winding resistance, d-axis inductance, and counter electromotive voltage constant with respect to the vector of voltage between the terminals before and after the d-phase current is varied, is the same as that shown in FIGS. 3A and 3B in the first embodiment.

Next, in step S202, the winding resistance R is calculated. Since $\Delta V_d = I_{d2}R - I_{d1}R$ from FIGS. 3A and 3B, the winding resistance R can be obtained from the following equation (6).

$$R = \Delta V_d / (I_{d2} - I_{d1}) \quad (6)$$

In step S203, the winding temperature of the synchronous motor is estimated from the calculated winding resistance in the same manner as in the first embodiment.

Then, in step S204, the d-axis inductance $L_d$ is calculated. The d-axis inductance $L_d$ can be calculated using the prescribed equation (2).

Next, in step S205, the counter electromotive voltage constant $K_v$ is calculated. $K_v$ can be calculated using the prescribed equation (4).

In step S206, the magnet temperature is estimated using the electromotive force constant $K_v$.

As has been described above, according to the synchronous motor temperature estimating apparatus in the second embodiment of the present invention, as in the synchronous motor temperature estimating apparatus of the first embodiment, the voltage between the terminals, etc. are monitored by varying the d-phase current, and the counter electromotive voltage and the winding resistance are estimated without using the q-axis inductance $L_q$; accordingly, the temperature of the synchronous motor can be estimated with good accuracy. Thus, the invention can, for example, achieve proper motor overheat protection and improve the accuracy of output estimation. Furthermore, since the winding temperature is estimated based on the winding resistance calculated from the detected values of the d-phase current and d-phase voltage, the provision of winding temperature detecting devices can be eliminated.

According to the synchronous motor temperature estimating apparatus in any of the embodiments of the present invention, the q-axis inductance $L_q$ is not used to calculate the temperature. Accordingly, the temperature of the synchronous motor can be estimated with good accuracy. Thus, the invention can, for example, achieve proper overheat protection for the synchronous motor and improve the accuracy of output estimation.

The invention claimed is:

1. A temperature estimating apparatus for a synchronous motor, comprising:
    a voltage command generating unit for controlling d-phase current by increasing or decreasing d-phase voltage and q-phase voltage by a command;
    a voltage acquiring unit for acquiring the d-phase voltage and q-phase voltage when the d-phase current is varied;
    a rotating speed detecting unit for detecting rotating speed of the synchronous motor;
    a current detecting unit for detecting the d-phase current and q-phase current;
    a winding temperature acquiring unit for acquiring winding temperature of the synchronous motor;
    a winding resistance converting unit for calculating winding resistance from the acquired winding temperature;
    an inductance calculating unit for calculating d-axis inductance based on the variation of the d-phase current and the variation of the q-phase voltage when the d-phase current is varied and on the rotating speed;
    a counter electromotive voltage constant calculating unit for calculating a counter electromotive voltage constant from the q-phase voltage, the d-phase current after being varied, the rotating speed, the q-phase current, the winding resistance, and the d-axis inductance; and
    a magnet temperature estimating unit for estimating magnet temperature of the synchronous motor based on the counter electromotive voltage constant.

2. A temperature estimating apparatus for a synchronous motor, comprising:
    a voltage command generating unit for controlling d-phase current by increasing or decreasing d-phase voltage and q-phase voltage by a command;
    a voltage acquiring unit for acquiring the d-phase voltage and q-phase voltage when the d-phase current is varied;
    a rotating speed detecting unit for detecting rotating speed of the synchronous motor;
    a current detecting unit for detecting the d-phase current and q-phase current;
    a winding resistance calculating unit for calculating winding resistance from the variation of the d-phase current and the variation of the d-phase voltage when the d-phase current is varied;
    a winding temperature estimating unit for estimating winding temperature of the synchronous motor from the winding resistance;
    an inductance calculating unit for calculating d-axis inductance based on the variation of the d-phase current and the variation of the q-phase voltage when the d-phase current is varied and on the rotating speed;
    a counter electromotive voltage constant calculating unit for calculating a counter electromotive voltage constant from the q-phase voltage, the d-phase current after being varied, the rotating speed, the q-phase current, the winding resistance, and the d-axis inductance; and
    a magnet temperature estimating unit for estimating magnet temperature of the synchronous motor based on the counter electromotive voltage constant.

* * * * *